United States Patent [19]

Spence et al.

[11] Patent Number: 5,133,987

[45] Date of Patent: Jul. 28, 1992

[54] STEREOLITHOGRAPHIC APPARATUS AND METHOD

[75] Inventors: Stuart T. Spence, S. Pasadena; Charles W. Lewis, Van Nuys; Mark A. Lewis, Valencia, all of Calif.

[73] Assignee: 3D Systems, Inc., Valencia, Calif.

[21] Appl. No.: 427,885

[22] Filed: Oct. 27, 1989

[51] Int. Cl.⁵ .......................... B05D 3/06; B05C 5/00; B29C 35/08
[52] U.S. Cl. .................................. 427/53.1; 118/620; 156/273.3; 264/22; 264/308; 356/121; 364/473; 425/174.4; 427/54.1; 427/55
[58] Field of Search ............... 425/174.4, 174; 264/22, 264/308; 156/273.3; 427/54.1, 55, 53.1; 118/620; 356/121; 364/473, 474.24

[56] References Cited

U.S. PATENT DOCUMENTS

| | | | |
|---|---|---|---|
| 3,989,778 | 11/1976 | Osborne | 425/174.4 X |
| 4,575,330 | 3/1986 | Hull | 425/174.4 X |
| 4,999,143 | 3/1991 | Hull | 264/22 |
| 5,002,854 | 3/1991 | Fan et al. | 425/174.4 X |
| 5,014,207 | 5/1991 | Lawton | 364/473 X |
| 5,015,424 | 5/1991 | Smalley | 264/308 X |
| 5,031,120 | 7/1991 | Pomerantz et al. | 425/174 X |
| 5,058,988 | 10/1991 | Spence | 356/121 |
| 5,059,021 | 10/1991 | Spence et al. | 356/121 |

*Primary Examiner*—Richard L. Chiesa
*Attorney, Agent, or Firm*—Lyon & Lyon

[57] ABSTRACT

A stereolithographic device and method including a process module, a control module and a service module. A laser is employed through a dynamic mirror system controlled by the control module to generate solidified cross sections of a selected part design on the surface of a photocurable polymer liquid. By lowering cured cross sections into the vat, additional cross sections can be perpared and joined therewith to define a prototype product. A stationary mirror in the beam path between the dynamic mirror system and the photocurable polymer is employed to make the system more compact and practical. A calibration and normalization process provides correction to distortions and misalignment of the stationary mirror.

9 Claims, 4 Drawing Sheets

STEREOLITHOGRAPHIC APPARATUS AND METHOD

BACKGROUND OF THE INVENTION

The field of the present invention is stereolithographic apparatus for the production of three-dimensional objects.

Stereolithography has come to be employed as a method for the fabrication of complex prototype parts. This is accomplished by successively printing cross-sectional layers of the intended part on top of one another through the curing of a photocurable polymer at the surface of a vat of such material. After the curing of one cross-sectional layer, that cross section is lowered in the vat below the surface of the liquid by the desired thickness of the successive cross section. One or more of various methods are used to insure the formation of a smooth liquid coating over the just cured cross-sectional layer. The thickness of the smooth coating is equal to the desired thickness of the successive cross section. The successive cross section is then produced at the surface of the vat such that it is physically joined with the prior cross section. Through repetition of this process and probable changes in the successive cross sections, a physical part may be constructed. This is extremely useful in the making of prototype parts and the like. Stereolithographic systems are described in U.S. Pat. No. 4,575,330 which is incorporated herein by reference as if fully set forth.

Several means have been contemplated for the lithographic step. Electromagnetic radiation beams tracing across the target surface of photocurable polymer, masks with generally-directed radiation, chemical jets and heat form some of the possibilities which may be used to create the desired cross sections. One such system which has found substantial practical utility employs an electromagnetic beam typically generated by a laser. Computer-controlled dynamic mirror systems may be used with such a beam generator to generate a selected tracing of the beam at a photosensitive surface. In stereolithographic systems, the selected beam tracing generated is on the surface of a photocurable polymer liquid where each successive cross section is formed. Reference is made to U.S. patent application Ser. No. 07/331,644, filed Mar. 31, 1989, entitled "METHOD AND APPARATUS FOR PRODUCTION OF HIGH RESOLUTION THREE-DIMENSIONAL OBJECTS BY" the disclosure of which is incorporated herein by reference as if fully set forth.

There are a number of considerations which are advantageously undertaken in the design of a stereolithographic apparatus. When using a dynamic mirror system to trace the desired pattern, a laser beam may be used which is passed through a converging lens before being directed by the mirrors to the working surface. This lens is chosen to bring the beam to a focus on the working surface of curable material which is often a liquid photocurable resin. Before passing through this converging lens, the beam may be passed through a diverging lens in order to increase its size and thereby allow a smaller image point to be formed after being focused by the converging lens. All parts of the horizontal liquid surface upon which the beam is to be traced do not have the same path length from the dynamic mirror system; and, therefore, the beam may not be in optimum focus at all such parts of the horizontal liquid surface. The beam must be focused to a relatively fine point so that maximum resolution of details may be realized in the part being formed. Because of this focusing problem, a system employing a small field of view relative to the beam path length is desirable. This small field of view refers to the target surface dimensions (maximum width) being small relative to the part length between the scanning mirrors and the target surface. In other words, the angular displacement of the scanning mirrors should be small when traversing between extremes on the target surface. This design criteria is at odds with the need to make relatively large parts with such a system and keep the size of the system within reasonable limits.

The orientation of the beam is also of importance. As cure rates are affected by beam intensity (power/per unit area), it is advantageous to have a relatively uniform orientation of the beam on the surface. Similarly, a problem can occur whenever solidifying radiation impinges on the target surface at angles other than ninety degrees. When this happens, resin will be cured at these same angles, giving rise to a roughness of part finish known as the shingle effect. Therefore, a design consideration is to have the beam as close to perpendicular to the liquid surface as possible. Again, small patterns relative to the length of beam path enhance this desired condition.

It should be noted that the shingle effect is reduced by building layers which are thin relative to the error which can be tolerated. This is because it is the displacement in the X-Y position of the beam at the liquid surface and the X-Y position of the beam at one layer thickness below the surface that gives rise to the error which causes the shingle effect. The thinner the layers, the more off perpendicular the beam can strike the surface without producing significant shingling. In equation form, the maximum angular displacement of the beam from off center, $\Theta$, is equal to the arctangent of the error which can be tolerated divided by the layer thickness. For an error tolerance of 2 mils and a layer thickness of 20 mils, for example, the maximum angular displacement of the beam can be about 5.7 degrees. However, if the layer thickness is reduced to 5 mils, the maximum angular displacement can be increased to about 21 degrees.

Additional lenses and other optical devices can reduce or eliminate some or all of these problems but result in a substantial increase in the cost of the overall system.

Other design considerations influence the layout of the system. It is advantageous to have a large numerical aperture for the beam being focused on the working surface for the purpose of obtaining a sharp image from reduced beam diffraction. However, this advantage may be offset due to the much greater difficulty in maintaining a sharp focus over a wide working area because of both the smaller image and the wider incident and exit cone of the beam. Again, this makes a reduced field of view relative to the length of the beam path advantageous. Also affecting the design are the dynamic mirrors. They often present the limiting aperture in such a system. Mirror speed is affected by size since larger mirrors have higher inertia. The ability of mirrors to function over large reflective angles is also limited. At the same time, mirror control is more precise if a given increment of distance at the working surface requires a relatively large pivotal displacement of the mirror. Thus, the foregoing design considerations give conflicting requirements between long and short beam path lengths. A compromise "best distance" is preferably selected.

Thus, in designing stereolithographic systems, compromises between drawing speed, accuracy and system cost must be considered. Balancing these factors, it has been found that a path length in the range of about 2 to 5, and preferably in the range of about 3 to 4 times the maximum linear dimension of the working surface is a reasonable compromise of competing factors. This relationship may also be understood as having a beam intersection with the target surface not exceeding about 14 degrees from some nominal angle of incidence, such as, for example, perpendicular to the liquid surface. However, to obtain a large prototype part, these relationships then require a comparatively large stereolithographic system.

As mentioned earlier, the ratio between path length and maximum linear dimension of the working surface depends on several competing factors, and the preferable ratio for a particular situation depends on which of these factors may be dominant. As defined here, the path length is the distance the beam travels after it leaves the dynamic mirrors until it reaches the resin surface. The factors that yield the lower limit on the ratio range are: (1) shingling effects, (2) variation in beam intensity, (3) maximum angular speed and acceleration of the scanning mirrors, (4) difference in path length, etc. Depending on the significance and control over these factors, this lower limit may be increased or decreased. Similarly the factors that lead to the upper limit on the range are: (1) resolution of the angular placement of the scanning mirrors, (2) size of the scanning mirrors necessary to get a particular spot size at the target surface, etc. Depending on the significance and control over these factors, this upper limit may be increased or decreased.

A path length which is too long may have the following negative consequences. First, since the linear resolution associated with tracing the beam on the surface is equal to the angular resolution multiplied by the path length, a long path length may result in an unacceptable loss of linear resolution. Second, a longer path length may require larger dynamic mirrors in order to achieve a desired beam size at the resin surface. This is because the size of the dynamic mirrors may be the limiting aperture in the optical system. The dynamic mirrors, however, are typically very expensive, larger ones even more so. In addition, larger dynamic mirrors may not have the speed or acceleration of smaller mirrors.

A path length which is too short, on the other hand, will also have negative consequences. First, a shorter path length will exacerbate the shingling effect, perhaps unacceptably, since the beam will strike the resin surface, especially at the outer extremes of the vat, at more exaggerated angles. Second, a shorter path length may result in a non-uniform intensity at the resin surface, especially at the outer reaches of the vat, where the angle of incidence is more extreme. This may result in a non-uniform cure depth. Third, a shorter path length may result in a more significant difference between the path lengths of a beam directed to the center of the vat, and one directed to the outer extremes of the vat. Therefore, at the outer reaches, the beam may intersect the resin surface outside the range of the beam waist. The beam waist is the focal area around the point where the vertices of the incident and exit cones of the beam touch, such that the beam size is approximately constant. The beam will therefore be out of focus in the outer reaches, so the beam size will be too large. This can also result in a non-uniform cure depth due to an associated decrease in beam intensity. An additional difficulty arises from the need to vary the angular scanning speed of the mirrors as the path length changes in order to maintain constant translational speed of the beam on the target surface, which is desirable in order to maintain uniform exposure.

In sum, for the reasons set forth above, it has been found that for the present embodiment, a path length which is about in the range of 2 to 5, and preferably, in the range of about 3 to 4 times the maximum linear dimension of the target surface will be an acceptable range. Of course, for other embodiments, a different range may be appropriate, since one or more of the factors mentioned above may become more significant. The subject invention is intended to encompass these other embodiments, and also corresponding changes in the ratio of path length to maximum linear dimension of the target surface.

By expanding the size of the machine, practical difficulties inherently exist. The size itself becomes impractical. Since in the preferred embodiment, a free liquid surface is used, and it is horizontal, the beam is to be directed vertically from above the working surface. These same difficulties arise in embodiments where exposure occurs through the bottom of the vat containing the liquid resin, or through the side of the vat. In these cases, increasing the working surface can be limited by system length. Increasing the target area can, therefore, be limited by system height. The structures required in maintaining the relative positions of all components can also be complicated or require greater attention in manufacture and use. Aiming of the beam is made more complicated. Maintaining a coherent beam can be more complicated as well.

Proper control of the beam in such stereolithographic systems has been addressed. Reference is again made to U.S. patent application Ser. No. 07/331,644, and to U.S. patent application Ser. No. 07/428,492, which is fully incorporated by reference herein as though set forth in full. The beam profile itself may be measured such that the beam power and focus may be controlled and the cure depths and width of plastic created in the photocurable liquid may be predicted. Reference is made to U.S. Pat. No. 5,058,988, and to U.S. patent application Ser. No. 07/429,911, the disclosures of which are incorporated by reference herein as if fully set forth. Correcting the drift of a beam due to any cause has also been addressed. Reference is made to U.S. Pat. No. 5,059,021, the disclosure of which is incorporated herein by reference as if fully set forth. Further, calibration and normalization of the beam across a grid on the target surface has also been addressed in U.S. patent application Ser. No. 07/268,837, the disclosure of which is incorporated herein by reference as if fully set forth. Each of these processes and the apparatus therefor are designed to correct the beam at or about the target surface. Thus, they cooperate with the system computer control regardless of the equipment employed to generate and deliver the conditioned beam to the target surface.

Other teachings relevant to stereolithographic systems for creating three-dimensional parts are found in the following disclosures which are incorporated herein by reference as if fully set forth: U.S. Pat. Nos. 4,999,143 and 5,015,424, U.S. patent application Ser.

Nos. 07/268,429 and 07/339,246 and International Patent Application serial no. PCT/US89/4096.

SUMMARY OF THE INVENTION

The present invention is directed to systems for creating objects by stereolithographic processes. To this end, a mirror is employed in the beam path between a dynamic mirror system and the target surface. Such a mirror has the capability of effectively reducing the overall size of the apparatus. This is especially useful for creating large objects. Such a reduction is practical in and of itself and eases the complication of necessary structure and the maintenance of relative locations of several components. For example, the beam generator and dynamic mirror systems may be located closer to the target surface of the vat. The effects of thermally-induced strains and the like are correspondingly reduced. The initial location of the dynamic mirror system and the vat also need not be so critical as adjustment of the large intermediate mirror may be used to compensate for minor maladjustments in positioning of these elements.

The practical employment of an intermediate mirror between the dynamic mirror system and the target surface is enhanced through the aforementioned systems employed to profile, aim and calibrate the beam. To obtain advantage from such an intermediate mirror, it is roughly placed at between $\frac{1}{4}$ to $\frac{3}{4}$ of the distance along the beam path. The size of the mirror will necessarily become larger the closer the mirror is placed to the target surface. The placement of the mirror in this range may be based on several factors: (1) desire to minimize the entire apparatus size, (2) the desire to lift parts vertically out of the vat of resin without striking the big mirror, (3) desired location of various system components, etc. In a present preferred embodiment, the mirror is located about 6/10 of the way from the dynamic mirror system to the target surface. Thus, in this position, the mirror is relatively large, in excess of one-half the size of the target surface. To achieve required optical coherence and alignment would require a very precise mirror placement and reflective surface. However, through the use of a calibration and normalization system, such requirements are circumvented to a significant practical extent.

Thus, an object of the present invention is to provide a practical stereolithographic system for the creation of solid objects by stereolithography, especially large objects. Another object of his invention is to reduce the size of such a stereolithographic apparatus. Other and further objects and advantages will appear hereinafter.

DETAILED DESCRIPTION OF THE PREFERRED EMBODIMENT

Figure 1:
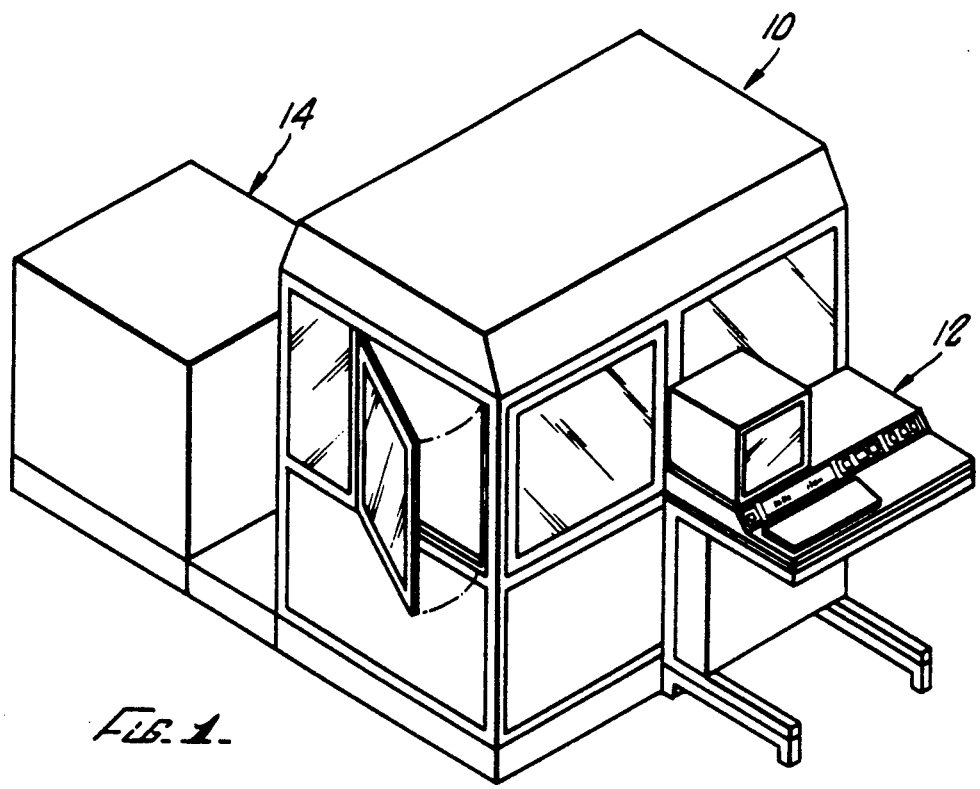
FIG. 1 is a perspective view of a stereolithographic system.

Turning in detail to the drawings, a stereolithographic apparatus is illustrated. Referring explicitly to FIG. 1, the device includes a main process module 10, a control module 12 and a service module 14. The process module 10 includes the vat, the laser and the necessary optics. The control module 12 includes the process control computer, a screen and a keyboard and/or control panel. The service module 14 can accommodate additional equipment such as heaters, filters, power supplies and the like, as well as providing room for storage.

Figure 2:
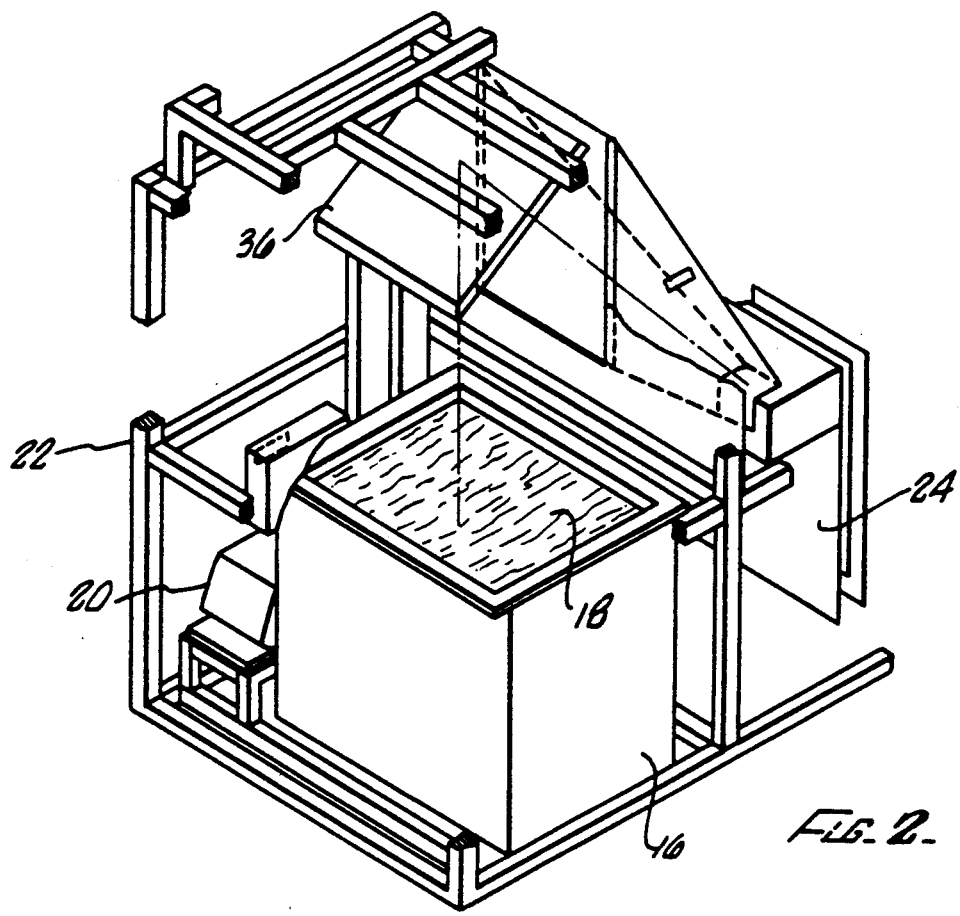
FIG. 2 is a perspective view of a stereolithographic device with major portions of the covering broken away for clarity.

FIG. 2 illustrates the interior of the process module 10. The process module 10 includes a vat 16 which is located within the module. The vat 16 contains a photocurable polymer 18 which is in a liquid state and carefully maintained at a specific surface level. Alternatively, instead of a liquid polymer, the vat could contain a fluid-like medium, such as a powder, which melts by absorption of infrared (IR) light, and which is capable of resolidification after cooling. In this instance, the mirror material coatings (if any) of the various optical components (to be described subsequently) should be chosen to yield adequate reflection at the appropriate wavelength.

The surface level of the liquid polymer 18 defines a horizontal target surface also known as the working surface. Located within the vat 16 is an elevator platform which can be very precisely raised and lowered to locate the developing part for creation of subsequent cross-sectional elements. Each element is exposed by drawing at the surface of the liquid, and it is thereby cured to a particular depth into the liquid to form a thin lamina. In this embodiment, the horizontal target surface is intended to be relatively large, e.g., 20"×20" square. The elevator system is best illustrated through a review of the aforementioned U.S. Pat. No. 4,575,330 and the aforementioned U.S. patent application Ser. No. 07/331,664.

Figure 3:
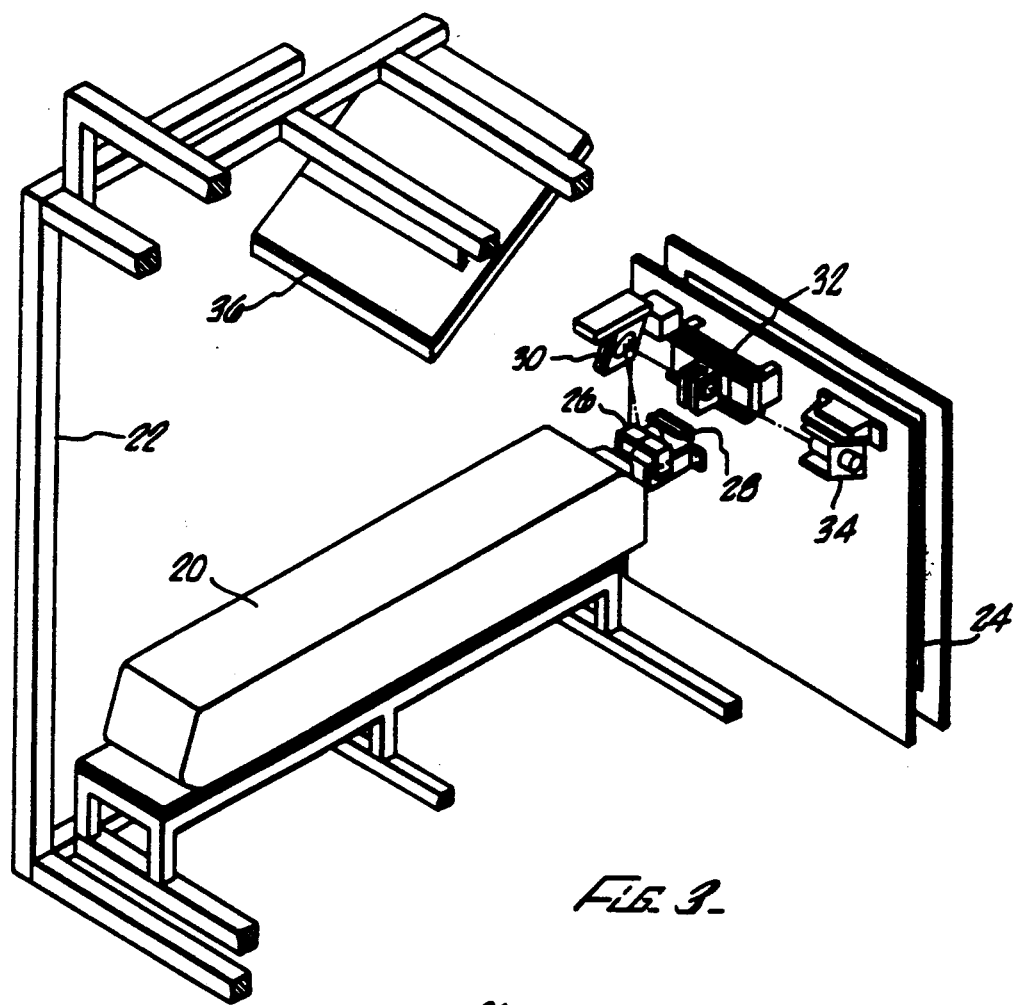
FIG. 3 is a perspective view with substantial portions broken away for clarity of a laser, mirror and optics system and large mirror arrangement.
Figure 4:
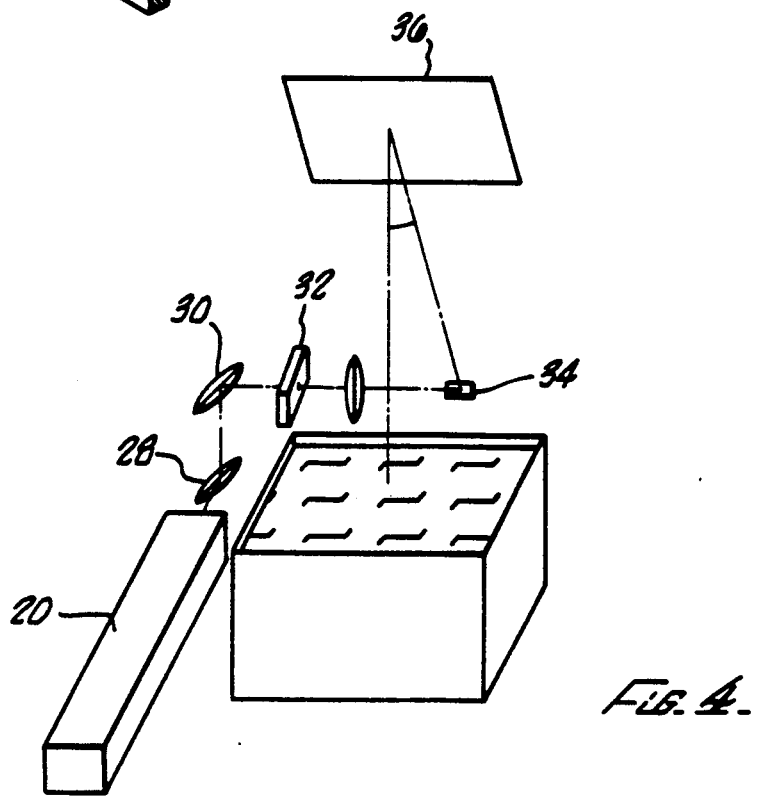
FIG. 4 is a schematic illustration of the optics of a preferred embodiment of the present invention.

Located adjacent to the vat 16 in the process module 10 is an ultraviolet argon-ion laser 20. The laser 20 is also fixed in position in the device, typically mounted to a frame 22. The laser is selected to have the proper characteristics for the curing of photocurable polymer to a predetermined depth at the horizontal target surface, at a desired rate. The laser may be oriented as best determined for function and ease of service. As can be seen from FIG. 2, the laser and vat can be positioned within a relatively compact area. An optics plate 24 is positioned in front of the laser 20 and provides a secure mounting for very accurately fixing a number of optical components. As can be seen in FIG. 3, first, a shutter assembly 26 is positioned directly in front of the laser 20. This shutter is pivotally mounted to rapidly swing into position in front of the laser to block the beam, or out of position to allow the beam to continue to the optics. The shutter may conveniently be controlled by safety latches associated with the body of the device to prevent unsafe operation. Two mirrors 28 and 30 operate to turn the beam by 90° each to align it with a beam expander 32 and a second shutter assembly and the scanning mirror system 34. It should be appreciated that this function can be accomplished with one mirror. The beam expander 32 enlarges and focuses the laser beam so that after passing through the rest of the optics, the beam waist is at the horizontal target surface. From the beam expander 32, the beam is directed to the dynamic (scanning) mirror system 34.

The dynamic mirror system 34 preferably includes two high speed scanning mirrors. The 2-mirror, 2-axis galvanometer scan heads sold by General Scanning Inc. of Watertown, Massachusetts, have been found to be satisfactory for this purpose and specifically their model DX-2005 servo and model XY-0507 galvanometer XY scanning heads. Alternatively, the Greyhawk Systems (Milpitas, California) scanning mirror system 11331-001 may be used. These mirrors can accurately be positioned at higher velocities. Reference is made to U.S. patent application, Ser. No. 07/428,492, referenced earlier. The dynamic mirror system 34 is also fixed relative to the optics plate so as to be carefully aligned with the beam path. These mirrors operate along two substantially perpendicular axes to generate a tracing of the received beam from the laser 20 in a horizontal plane along the X and Y axes of the target surface at a fixed distance at which the laser beam is focused by the beam expander 32.

The dynamic mirror system 34 is oriented to direct the received beam upwardly to above the vat 16. Located fixed to the frame 22 is a stationary mirror 36. The stationary mirror 36 is fixed to the frame 22 facing downward with a normal to the mirror at an angle of about 22½° to the vertical. This 22½° rotation from vertical is toward the scanning mirrors. The center of the mirror 36 is directly over the horizontal target surface of the vat 16. The dynamic mirror system directs a beam at approximately 45° to the vertical towards the center of the stationary mirror 36. Thus, the beam incident upon the mirror 36 is at an angle which is 22½ to the mirror normal when the beam is centered on the mirror. This geometric relationship causes the reflected beam to be directed approximately vertically down at the horizontal target surface of the vat 16 so as to be normal to that surface when centered thereon. Other angular orientations of the stationary mirror are possible, with the constraint that the beam impinge upon the target surface at a substantially perpendicular orientation. If the layer thickness/cure depth is small enough, the need for perpendicular incidence at the resin surface is replaced by the need for substantially uniform incidence. Of course, non-perpendicular but uniform angles of incidence may require a beam shaping element to compensate for the elongation of the incident width of the beam on the target surface due to its non-perpendicular incidence.

Figure 7:
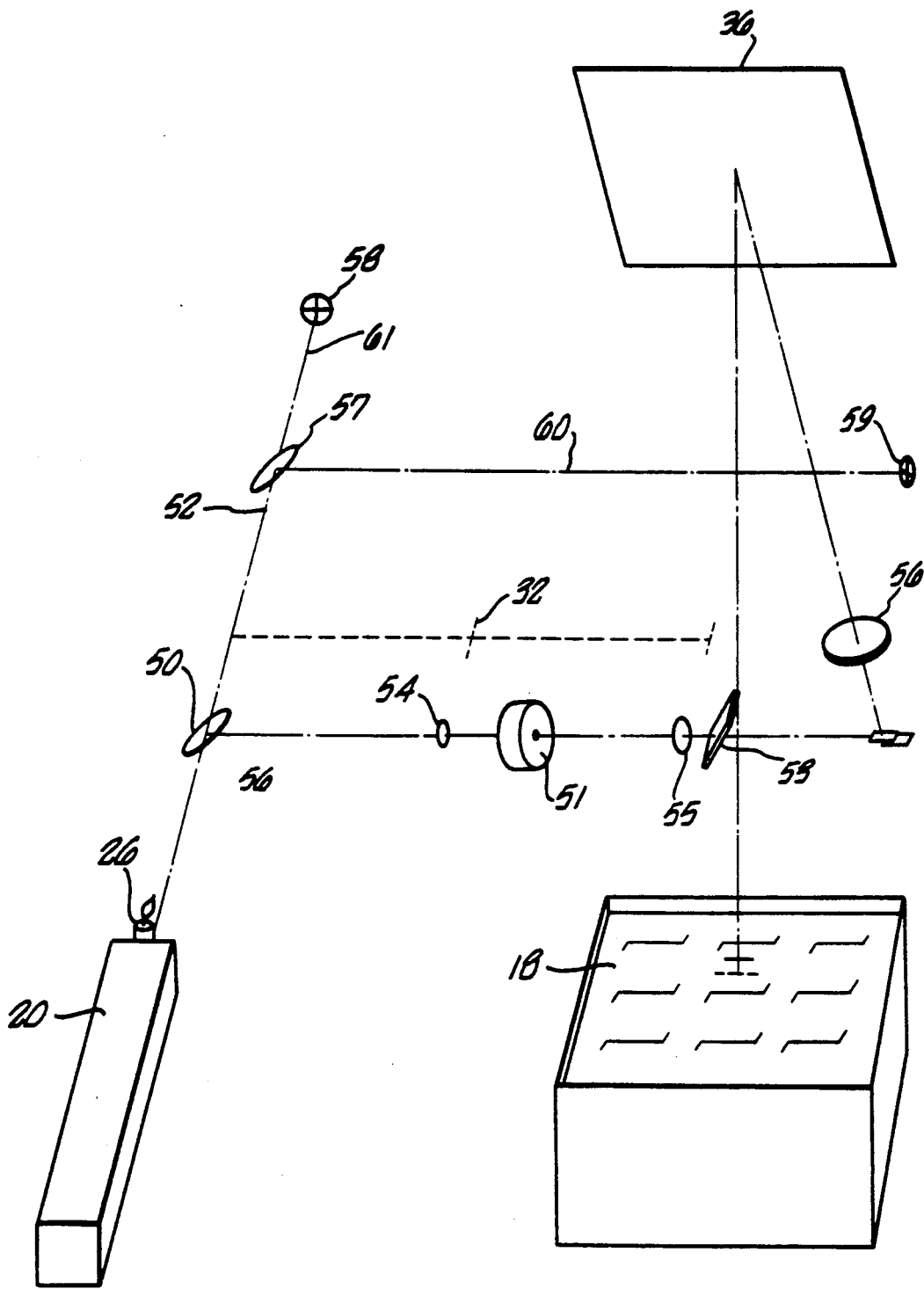
FIG. 7 is a schematic illustration of the optics of a second preferred embodiment of the present invention.

In another embodiment illustrated in FIG. 7, the optics plate (not shown in FIG. 7) is made horizontal as opposed to vertical, and there is only one 90 degree turning mirror 50 (folding mirror). A second fast shutter 51 is placed at the focal point of first lens 54 of the beam expander, and the turning mirror 50 also acts as a beam splitter to create secondary beam 52 that is used for aligning the laser when it needs to be changed. In addition, an attenuator 53 is placed after second beam expander lens 55. This attenuator may operate in two modes, substantially transparent and 95% blocking. The substantially transparent mode is used in almost all circumstances. The 95% blocking mode is used when the desired cure depth is low and the exposure will be based on scanning by vectors that overlap each other. An example of when this situation can occur is when shallow skin fill vectors are being drawn. Turning mirror 50 divides the beam into two paths, beam 56, which is about 99% of the incident beam, and beam 52 which is about 1% of the incident beam. Placed sequentially in the path of beam 56 is: (1) safety shutter 26, (2) folding mirror/beam splitter 50, (3) first beam expander lens 54, (4) fast shutter 51, (5) second beam expander lens 55, (6) attenuator 53, (7) dynamic mirrors 34, (8) window 56, which acts as an environmental seal, (9) big mirror 36, and (10) resin surface 18. A 50/50 beam splitter 57, and quad cells 58 and 59 are added as shown. The beam splitter is placed in the path of beam 52, and divides the beam into beams 60 and 61 of approximately equal intensity. Beam 60 then intersects quad cell 59, and beam 61 intersects quad cell 58. The quad cells are similar to the bi-cells described in Ser. No. 07/265,039 now abandoned, except that they provide four cells with which to sense the beam location, instead of just two cells, as with the bi-cell. The advantage of four cells is that they allow for two-dimensional line-up of the beam, as opposed to just one-dimensional line-up, which the bi-cells are restricted to. Quad cell 58 detects the location of beam 61, and quad cell 59 detects the location of beam 60. Each cell compares the beam location with a predetermined location, so that the positioning of laser 20 can be adjusted until the beam locations as detected by the quad cells are equal to the predetermined locations. As a result, if laser 20 must be replaced, the apparatus described above can be used to realign the laser so the beam emitted travels along the same path as its predecessor. This allows the laser to be replaced without requiring the rest of the optical system to be realigned. FIG. 7 also indicates the distance between the various components in millimeters.

In normal operation, the control module 12 is programmed to develop a series of tracings which define successive cross sections of a part to be fabricated. When the program is initiated, the laser beam is directed to the dynamic mirror system which scans the beam to create a selected tracing of the laser beam. This tracing is directed at the stationary mirror 36 and then to the horizontal target surface in the vat 16. The tracing is produced at the appropriate intensity and speed of traversing the target surface such that a solid cross section of photopolymer of desired thickness is formed. The elevator table within the vat is then moved to a new net position which is a distance below the next desired working surface, which distance is equal to the desired thickness of the next cross section to be formed. Recoating is performed to create a new flat working surface as described in International Patent Application Serial No. PCT/US 89/4096, referenced earlier. The dynamic mirrors are then driven to create a second tracing in registration with the first which will be adhered thereto. Through successive steps, an entire part can be generated.

The location of the stationary mirror 36 is arranged to provide an overall compact package to the process module 10 To do so, the mirror is located near the middle of the beam path so as to minimize the height of the overall apparatus. Such a location also minimizes the structural requirements in locating the components for precise alignment without spanning great distances.

Because the stationary mirror 36 is located at some distance from the dynamic mirror system, a relatively large mirror is required. If reliance is placed on the large mirror for exact reflection of the tracing by the laser beam from the dynamic mirror system, a very expensive, flat and carefully placed mirror would be required. Naturally, it is advantageous for practical reasons to avoid such expensive components. To avoid the foregoing, grid calibration and normalization of the system may be undertaken through measurements taken at or near the horizontal target surface. By measuring and calibrating at the target surface, the stationary mirror 36 becomes an integral part of the system with mirror distortion and misalignment as well as other factors automatically taken into account.

A calibration and normalization system is useable in a broad range of applications and systems. It automatically generates a "look-up table" to enable the conversion of computer design locations into instructions which are to be sent to the scanning system so that the intended pattern will be drawn on the working surface. The term "normalization" may be used to indicate that more than one dimension at a time is being corrected, while "calibration" could have connotations of applying a single scale factor to a system. In a preferred embodiment, the apparatus has a single position (beam profile) sensor which is moved automatically to an array of points on the working surface, and then a record is made of the corresponding mirror instructions needed to reach each of these points. In another preferred embodiment, a square array of sensor pinholes is utilized so that no movement of the sensor is required. In yet another preferred embodiment, a linear array of pinhole sensors needing to be moved along only one axis is utilized. The number of points in the array is determined by the desired resulting accuracy of the corrections. It is highly desirable to have the pin holes of the calibration plate located exactly at the desired target surface. Since this target surface is the location of the photopolymer surface, the vat is designed so it can be moved in and out of the machine, but more preferably the vat mounting system is designed to allow the vat to drop a sufficient distance to allow a calibration device to be placed at the target surface.

Another possibility is to have the pinhole(s) displaced somewhat above (or below) the level of the target surface. Based on the X-Y location of each pinhole, the distance between the pinholes and the scanning mirrors, one of ordinary skill could extrapolate the pinhole locations down to their expected positions at the target surface. This separation between the pinhole position(s) and the target surface may be useful for allowing the system to be calibrated without removing or repositioning the vat of photopolymer. This separation distance should be small enough, relative to other distances and to sources of error, that extrapolation does not introduce any significant deviations.

The distance between the scanning mirrors and the big mirror can range between about ¼ to ¾ of the total optical path length from the scanning mirrors to the target surface, starting with the dynamic mirror, and preferably ranges from between about ½ to ¾ of the total path length. In a presently preferred embodiment, the distance between the scanning mirrors and the big mirror is approximately 61 inches. The distance between the big mirror and the target surface is approximately 36 inches. The sum of these two distances is about 3.4 times the maximum linear dimension of the target surface defined by the vat size mentioned earlier (20"×20"×24"), which maximum dimension is about 28.3 inches. This is well within the ratio range mentioned earlier. In a system of these dimensions, it is conceivable that the calibration device could be located up to an inch or more from the target surface.

Another approach would be to calibrate at two different vertical heights above the target surface so that extrapolation may be done from the combination to yield a more precise location of points at the target surface. For this approach to yield a reasonably accurate location of points at the target surface, the two mentioned vertical heights would need to be separated by some minimum distance based on the distance the lower of the two positions is to the target surface.

Figure 5:
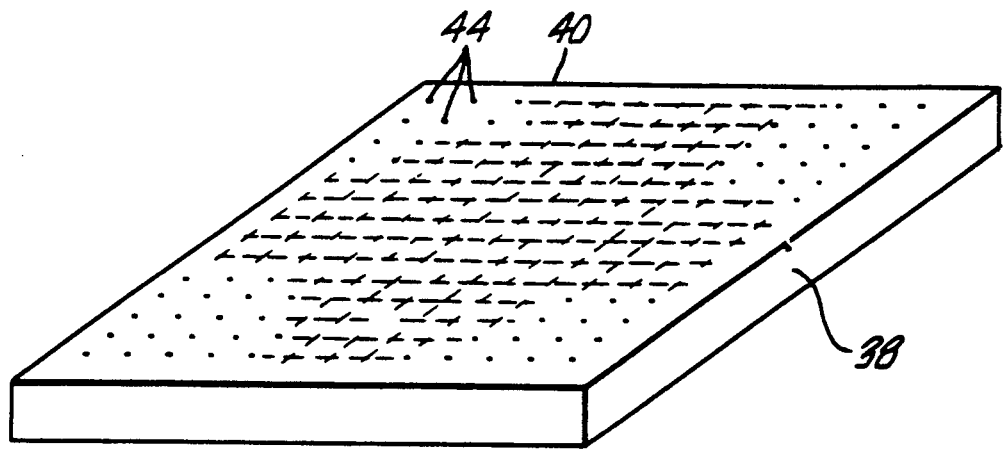
FIG. 5 is a perspective view of a calibration plate.
Figure 6:
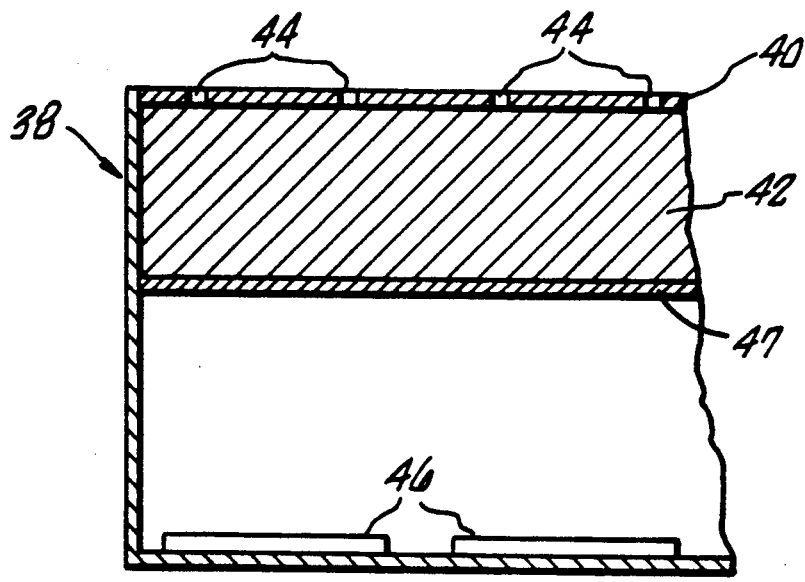
FIG. 6 is a cross-sectional side view of the calibration plate.

Turning to FIGS. 5 and 6 a square calibration plate 38 is depicted. An ultraviolet-opaque metallic coating 40 is provided by evaporation on a substrate 42 made preferably of quartz or pyrex of ¼-inch thickness. An array (49×49) of holes 44 are etched in the UV-opaque metallic coating 40 on ½-inch centers. Each etched hole has a diameter of $0.004" \pm 0.0005"$ although it is only important that the hole be of smaller diameter than the diameter of the projected beam at the plate/liquid surface for best resolution. In a preferred embodiment, the beam diameter at the target surface is under 10 mils. Sensors 46 which may be photodiodes are mounted inside the calibration plate below the substrate. When the calibration plate is in use, it is placed with the pinhole surface preferably located at the target surface of the photocurable liquid. However, as stated above, it may be offset a small distance therefrom with calculated corrections to compensate for the discrepancy.

In a presently preferred embodiment of the invention, an array of 5×5 or 25 photodiodes 46 sensitive to UV light are utilized in conjunction with the calibration plate. Diffuser material 47 is located between the substrate 42 and the sensors 46. Because light can only enter the plate 38 through one of the pinholes 44 and because the diffuser material 47 tends to diffuse light that enters, light entering a pinhole will travel horizontally beyond the exact location of the pinhole so that in a preferred embodiment 25 sensors such as the sensors herein previously described are adequate to cover an entire 49×49 array of pinholes.

Typically, a calibration procedure will be performed prior to shipping an apparatus to a customer, after delivery, and after any physical trauma to the mirror control or optical systems which would tend to cause misalignment.

In operation, the calibration procedure uses beam profiler methodology to obtain a "best location" of a pinhole from the centroid or comparable function of the scan data. A new "best location" is obtained for each pinhole in the case of the plate, each pinhole-column location in the case of the linear array, and each predetermined location in the case of a sensor positioned at certain predetermined locations. It is not always necessary to scan each pinhole in order to obtain a working and practically useable look-up table. In situations where there are smaller geometric distortions, or less precision is acceptable, or the other sources of distortion are suitable for correction with more reliance on interpolation, fewer pinholes could be mapped. Bi-linear or other interpolation relative to the X and Y locations is used to determine scanning mirror positioning for points intermediate to the "best locations" stored in the look-up table in memory. The appropriate number of pinholes may be determined from these and other considerations, from the time needed to make the calibration, from the system memory available for storing the look-up table and from the quality of the stationary mirror 36.

The calibration system can compensate for errors introduced by the various optical components with regard to placement of the beam at a given location. As stated earlier, these include the big mirror as well as other components. Therefore, if a non-flat mirror configuration is easily obtainable that reduces problems associated with focusing of the beam, or with shingling effects, etc., at the cost of less accurate placement of the beam onto the target surface, it can be used to advantage in the system. Such a mirror alone or in combination with telecentric optics or other optics might be an effective way of addressing some of these problems and therefore may lead to a further reduction in system size.

For example, the big mirror can be curved as well as flat as a part of a suitable optical system. Such a system may have advantages for addressing some of the problems discussed herein and may therefore be used to extend the range of ratios of path length to maximum horizontal dimension of the target surface.

Thus, an apparatus is disclosed which is capable of practical fabrication of prototype parts using stereolithography, especially large scale parts. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A system for stereolithographically producing a three-dimensional object from a medium capable of selective physical transformation upon exposure to synergistic stimulation, comprising:
    a beam generator for producing a beam of synergistic stimulation along an actual beam path;
    a container for holding the medium and defining a horizontal target surface;
    a dynamic mirror system arranged in a primary beam path, said dynamic mirror system being movable for generating a selected tracing of the beam from said beam generator to the target surface;
    a controller coupled with said dynamic mirror system for controlling the generation of a selected tracing of the beam;
    means disposed along said actual beam path before said dynamic mirror system for splitting the beam into a large primary portion and at least one significantly smaller secondary portion;
    means for sensing the at least one secondary portion to determine if the actual beam path is the same as a desired beam path and for providing an output signal indicative of the deviation between the actual and desired beam paths for enabling said actual beam path to be adjusted such that the beam travels along said desired beam path;
    a stationary mirror in the path of the beam tracing from said dynamic mirror system to said target surface, said stationary mirror being at an angle to said dynamic mirror system to reflect the beam tracing from said beam generator substantially vertically to said horizontal target surface;
    a beam sensitive grid positionable at approximately said horizontal target surface prior to producing said three-dimensional object and removable from said target surface prior to producing said three-dimensional object; and
    means for sensing the location of the tracing beam on said sensitive grid and calibrating said controller for controlling said dynamic mirror system such that when the controller directs the dynamic mirror system to expose a layer of said three-dimensional object at the target surface so that the layer will be accurately sized and shaped.

2. A system for stereolithographically producing a three-dimensional object from a medium capable of selective physical transformation upon exposure to synergistic stimulation, comprising:
    a means for generating a beam of synergistic stimulation along an actual beam path;
    a container for holding the medium and defining a target surface;
    a dynamic mirror system arranged along a primary beam path, said dynamic mirror system being movable for generating a selected tracing of the beam onto said target surface;
    means disposed along said actual beam path before said dynamic mirror system for splitting the beam into a large primary portion and at least one significantly smaller secondary portion; and
    means for sensing the at least one secondary portion to determine if the actual beam path is precisely the same as a desired beam path and for providing an output signal indicative of the deviation between the actual and desired beam paths which allows the actual beam path to be adjusted such that the beam travels along said desired beam path.

3. The system according to claim 2 wherein said means for sensing additionally comprises:
    means for dividing said at least one secondary portion into at least two ternary portions; and
    sensing means for sensing the location of said at least two ternary portions in at least two dimensions with respect to at least one predetermined position and for producing an output signal indicative of the deviation between the actual and desired beam paths for enabling the position of said actual beam path to be adjusted such that the beam travels precisely along said desired beam path.

4. The system of claim 3 comprising:
    a stationary mirror in the path of the selected beam tracing between said dynamic mirror system and said target surface, said stationary mirror positioned to direct the selected beam tracing to said target surface.

5. A method for stereolithographically producing a three-dimensional object from a medium capable of selective physical transformation upon exposure to synergistic stimulation, comprising the steps of:
    generating a beam of synergistic stimulation along an actual beam path to effect said physical transformation;
    providing a target surface where the physical transformation of the medium occurs, said target surface comprising a surface of a quantity of said medium;
    selectively splitting the beam into at least one smaller secondary beam and a substantially larger primary beam;
    controllably scanning said primary beam to expose a predetermined locus of points on said target surface to effect said physical transformation;
    successively renewing said target surface with untransformed medium and successively selectively physically transforming said renewed target surface to thereby form successive cross-sectional portions of the object at said target surface; and
    sensing the at least one secondary beam to determine if the actual beam path is the same as a desired beam path and providing an output signal indicative of the deviation between the actual and desired beam paths which allows the actual beam path to be adjusted such that the beam travels precisely along said desired beam path.

6. A system for stereolithographically producing a three-dimensional object from a medium capable of selective physical transformation upon exposure to synergistic stimulation, comprising:

a means for generating a beam of synergistic stimulation along an actual beam path;

a means for providing a target surface comprising a surface of a quantity of said medium;

a means, disposed along said beam path, for selectively directing the beam to expose a predetermined pattern of the surface of the medium at the target surface;

means disposed along said actual beam path before said means for selectively directing for splitting the beam into a large primary portion and at least one significantly smaller secondary portion; means for sensing the at least one secondary portion to determine if the actual beam path is the same as a desired beam path and for providing an output signal indicative of the deviation between the actual and desired beam paths which allows said actual beam path to be adjusted such that the beam travels along said desired beam path; and a stationary mirror along said desired beam path between the means for selectively directing and the target surface, said stationary mirror positioned to direct the beam to said target surface.

7. The system according to claim 6 wherein said means for sensing additionally comprises:

means for dividing said at least one secondary portion into at least two ternary portions along at least two attenuated beam paths; and sensing means for sensing the position of said at least two ternary portions in at least two dimensions with respect to at least one predetermined position and for producing an output signal indicative of the deviation between the actual and desired beam paths for enabling the position of said actual beam path to be adjusted such that the beam travels precisely along said desired path.

8. The system according to claim 6 wherein said stationary mirror is located in the range of about ¼ to ¾ of a distance from the means for selectively directing to the target surface.

9. A system for stereolithographically producing a three-dimensional object from a medium capable of selective physical transformation upon exposure to synergistic stimulation, comprising:

means for generating a beam of synergistic stimulation along an actual beam path to effect said physical transformation;

means for providing a target surface where the physical transformation of the medium occurs, said target surface comprising a surface of a quantity of said medium;

means for selectively splitting the beam into at least one smaller secondary beam and a substantially larger primary beam;

means for controllably scanning said primary beam to expose said primary beam to impact a predetermined locus to points on said target surface to effect said physical transformation;

means for successively renewing said target surface with untransformed medium and for successively selectively physically transforming said renewed target surface to thereby form successive cross-sectional portions of the object at said target surface; and means for sensing the at least one secondary beam to determine if the actual beam path is the same as a desired beam path and providing an output signal indicative of the deviation between the actual and desired beam paths which allows the actual beam path to be adjusted such that the beam travels precisely along said desired beam path.

* * * * *